United States Patent
Scipioni

(10) Patent No.: US 10,937,049 B2
(45) Date of Patent: *Mar. 2, 2021

(54) DIGITAL CONTENT PROVIDED TO A USER AT A PHYSICAL LOCATION

(71) Applicant: PAYPAL, INC., San Jose, CA (US)

(72) Inventor: German Carlos Scipioni, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 631 days.

This patent is subject to a terminal disclaimer.

(21) Appl. No.: 15/694,384

(22) Filed: Sep. 1, 2017

(65) Prior Publication Data

US 2018/0121947 A1    May 3, 2018

Related U.S. Application Data

(63) Continuation of application No. 13/333,170, filed on Dec. 21, 2011, now Pat. No. 9,754,276.

(51) Int. Cl.
*G06Q 10/00* (2012.01)
*G06Q 30/02* (2012.01)

(52) U.S. Cl.
CPC ..... *G06Q 30/0238* (2013.01); *G06Q 30/0207* (2013.01)

(58) Field of Classification Search
None
See application file for complete search history.

(56) References Cited

U.S. PATENT DOCUMENTS

| | | | | |
|---|---|---|---|---|
| 6,985,588 | B1 * | 1/2006 | Glick | G06F 21/10 380/258 |
| 7,542,771 | B2 * | 6/2009 | Gorsuch | G06Q 30/06 455/456.3 |
| 7,925,245 | B1 * | 4/2011 | Soelberg | H04L 65/1059 455/412.2 |
| 7,933,810 | B2 * | 4/2011 | Morgenstern | G06Q 30/02 705/26.1 |
| 8,073,460 | B1 | 12/2011 | Scofield et al. | |
| 8,213,898 | B2 * | 7/2012 | Choti | G06Q 10/0875 455/404.2 |
| 8,639,630 | B2 * | 1/2014 | Fomenko | G06F 21/10 705/71 |

(Continued)

OTHER PUBLICATIONS

62. Axel Küpper, Ulrich Bareth, and Behrend Freese (Geofencing and Background Tracking—The Next Features in LBSs, Informatik 2011—Informatik schafft Communities 41. Jahrestagung der Gesellschaft für Infornnatik , Oct. 4-7, 2011, Berlin) (Year: 2011).*

(Continued)

*Primary Examiner* — Hafiz A Kassim
(74) *Attorney, Agent, or Firm* — Haynes and Boone LLP

(57) ABSTRACT

A method for providing a promotion to a user to do commerce at a physical location includes offering a right to a particular piece of digital content to the user as an incentive to a commercial transaction that occurs at least partly at the physical location, discerning that the user is located at the physical location, and in response to the discerning, interacting with the user to provide the digital content to the user on a mobile device associated with the user.

20 Claims, 3 Drawing Sheets

FIG. 2

(56) References Cited

U.S. PATENT DOCUMENTS

| | | | |
|---|---|---|---|
| 2002/0116266 A1* | 8/2002 | Marshall | G06Q 30/02 705/14.14 |
| 2003/0216960 A1* | 11/2003 | Postrel | G06Q 30/02 705/14.26 |
| 2004/0078293 A1* | 4/2004 | Iverson | G06Q 30/0641 705/26.41 |
| 2004/0139161 A1* | 7/2004 | Loh | G06Q 30/02 709/206 |
| 2005/0004873 A1* | 1/2005 | Pou | G06F 21/10 705/51 |
| 2006/0030335 A1* | 2/2006 | Zellner | H04W 12/02 455/456.1 |
| 2006/0031168 A1* | 2/2006 | Remi | G06Q 30/06 705/52 |
| 2006/0242154 A1* | 10/2006 | Rawat | G06F 16/168 |
| 2006/0270421 A1* | 11/2006 | Phillips | H04W 4/021 455/457 |
| 2007/0276795 A1* | 11/2007 | Poulsen | G06Q 90/00 |
| 2008/0086379 A1* | 4/2008 | Dion | G06Q 30/0235 705/14.1 |
| 2008/0092244 A1* | 4/2008 | Lee | H04L 63/10 726/28 |
| 2008/0133336 A1* | 6/2008 | Altman | H04L 51/32 455/456.1 |
| 2008/0133360 A1* | 6/2008 | Ullah | H04N 21/25841 705/14.64 |
| 2009/0048922 A1* | 2/2009 | Morgenstern | G06Q 30/02 705/14.68 |
| 2009/0061793 A1* | 3/2009 | Jung | H04W 4/024 455/90.1 |
| 2009/0249244 A1 | 10/2009 | Robinson et al. | |
| 2010/0077017 A1* | 3/2010 | Martinez | H04L 67/18 709/201 |
| 2010/0082397 A1 | 4/2010 | Blegen | |
| 2010/0223110 A1 | 9/2010 | Slavin et al. | |
| 2010/0268717 A1* | 10/2010 | Pilskalns | G06Q 30/02 707/754 |
| 2011/0029370 A1* | 2/2011 | Roeding | G06Q 30/0205 705/14.38 |
| 2011/0035788 A1* | 2/2011 | White | H04L 9/3231 726/4 |
| 2011/0170837 A1* | 7/2011 | Barnes, Jr. | H04L 67/18 386/239 |
| 2011/0191692 A1* | 8/2011 | Walsh | G06F 3/00 715/752 |
| 2011/0313874 A1* | 12/2011 | Hardie | G06Q 30/0639 705/26.1 |
| 2012/0123889 A1* | 5/2012 | Mosquera | G06Q 30/0601 705/26.1 |
| 2012/0130796 A1* | 5/2012 | Busch | G06Q 30/0267 705/14.36 |
| 2012/0208549 A1* | 8/2012 | Lau | H04W 4/021 455/456.1 |
| 2013/0074169 A1 | 3/2013 | Nuzzi et al. | |
| 2013/0166369 A1 | 6/2013 | Scipioni | |
| 2013/0276018 A1 | 10/2013 | Walter et al. | |

OTHER PUBLICATIONS

63. Annie Greenwald, Georg Hampel, Chitra Phadke, and Viswanath Poosala (An Economically Viable Solution to Geofencing for Mass-Market Applications, Bell Labs Technical Journal 16(2), 21-38 (2011) © 2011 Alcatel-Lucent) (Year: 2011).*

Shi-Jen Lin and Ding-Chyu Liu, "An Incentive-Based Electronic Payment Scheme for Digital Content Transactions Over the Internet," Journal of Network and Computer Applications, 2009.

* cited by examiner

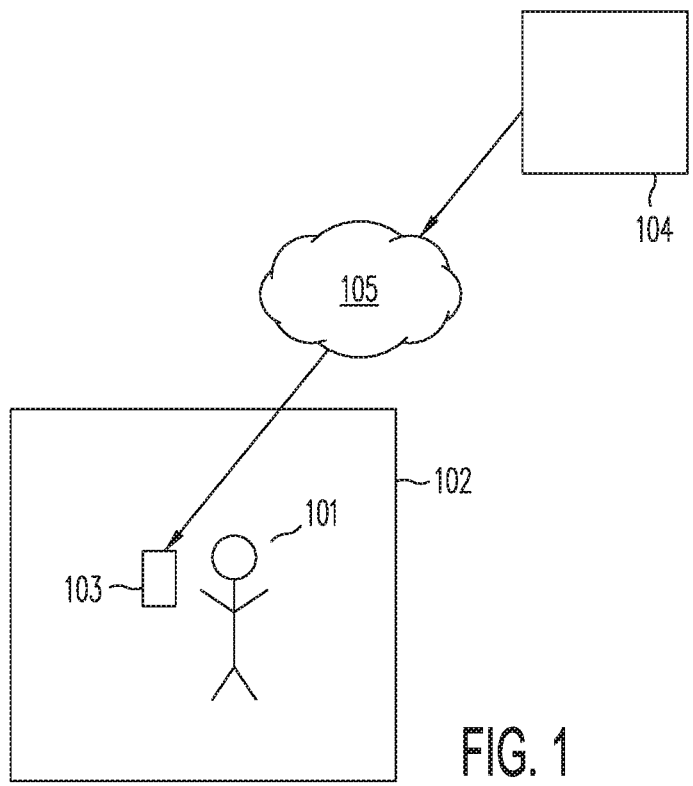

FIG. 1

Offering a right to a particular piece of digital content to the user as part of a commercial transaction that occurs at least partly at the physical location — 210

Discerning that the user is located at the physical location — 220

Interacting with the user to provide the digital content to the user on a mobile device associated with the user — 230

Completing the commercial transaction with the user — 240

Offering the user a chance to access the digital content after the user has left the physical location — 250

FIG. 2

DIGITAL CONTENT PROVIDED TO A USER AT A PHYSICAL LOCATION

CROSS-REFERENCE TO RELATED APPLICATIONS

This is a Continuation application to U.S. Utility application Ser. No. 13/333,170 filed Dec. 21, 2011, entitled "Digital Content Provided to a User at a Physical Location," the disclosure of which is incorporated herein by reference in its entirety.

BACKGROUND

Technical Field

The present disclosure generally relates to providing access to digital content and, more particularly, to providing access to digital content at specific physical locations.

Related Art

Online transactions are becoming more and more prevalent, with an ever-increasing number of online entities that may or may not have a physical real world counterpart. Furthermore, the services offered by these online entities have been improving as well. The popularity of online transactions is partially attributable to the ease and convenience of making a transaction online instead of at a physical location.

In addition to the on-line channel of commerce, other channels of commerce exist. For instance, some mobile applications are specifically aimed at commerce as well. Also, traditional brick-and-mortar locations offer users an experience at a physical location where the users can touch and sometimes try out a product before buying the product.

While brick-and-mortar stores have some advantages over on-line outlets, such as providing users a physical experience, some brick-and-mortar stores lose out on sales to on-line outlets because of the convenience of on-line outlets. Brick-and-mortar stores are always looking for new ways to compete with on-line commerce.

Furthermore, some brick-and-mortar locations may offer free use of Wi-Fi while at the location, and some locations (such as hotels) may offer access to various premium cable channels to guests, but no one in the marketplace currently offers specific digital content to a user's mobile device limited by the user's physical presence at the location.

SUMMARY

One of the broader forms of the present disclosure involves a method for providing a promotion to a user to do commerce at a physical location includes offering a right to a particular piece of digital content to the user as an incentive to a commercial transaction that occurs at least partly at the physical location, discerning that the user is located at the physical location, and in response to the discerning, interacting with the user to provide the digital content to the user on a mobile device associated with the user.

Another one of the broader forms of the present disclosure involves a method for participating in a promotion for commerce at a physical location includes receiving an offer for digital content as an incentive to a commercial transaction at the physical location between a user and another party, being physically present at the physical location, and interacting with a provider of the digital content to receive the digital content on a mobile device associated with the user conditioned on the user's being present at the physical location.

Yet another one of the broader forms of the present disclosure involves a mobile device includes a non-transitory, tangible computer readable storage medium storing a computer program, wherein the computer program contains instructions that when executed perform: receiving an offer for digital content as an incentive to a commercial transaction between a user and another party at a physical commercial location, the offer received at the mobile device, which is associated with a user, discerning a physical location of the user, granting electronic access of the digital content to the user in response to discerning that the user is at the physical commercial location, in which granting electronic access includes interacting with a provider of the digital content to receive the digital content on the mobile device, and denying electronic access of the digital content to the user in response to discerning that the user is not at the physical commercial location.

Yet another one of the broader forms of the present disclosure involves a method for providing a promotion to a user at a physical location includes offering a right to a particular piece of digital content to the user as an incentive to the user to be present at the physical location, discerning that the user is located at the physical location, and in response to the discerning, interacting with the user to provide the digital content to the user on a mobile device associated with the user.

BRIEF DESCRIPTION OF THE DRAWINGS

FIG. 1 is an illustration of an aspect of an example embodiment showing a user at a physical location receiving digital content from a content provider.

FIG. 2 is an illustration of an example process according to one embodiment.

DETAILED DESCRIPTION

Figure 3:
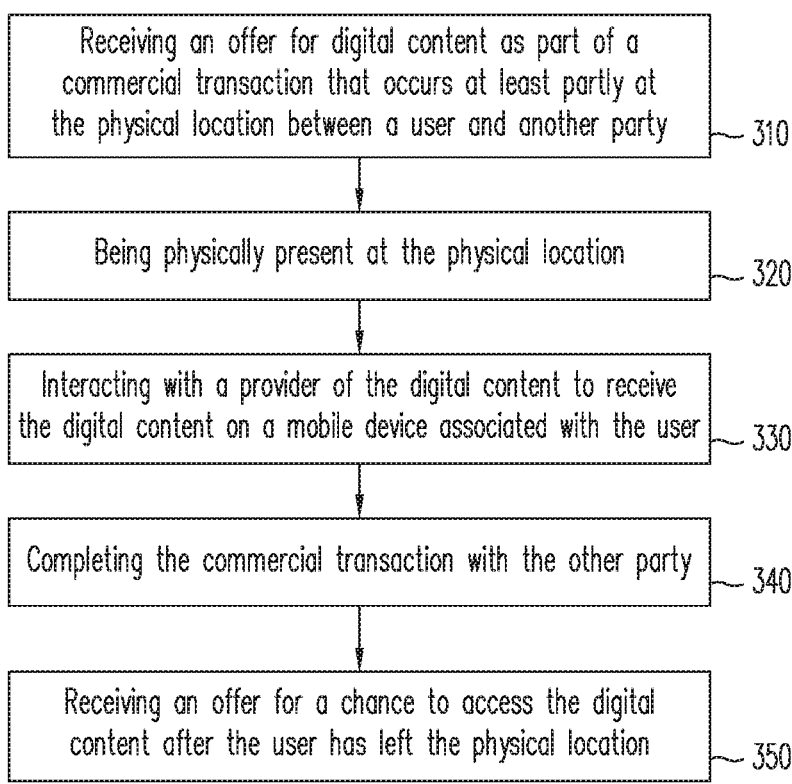
FIG. 3 is an illustration of an example process according to one embodiment.

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

As the Internet continues to evolve, users become accustomed to receiving media on-line and on their mobile devices. Various embodiments provide techniques to use digital content as an incentive to commerce at a physical location. For instance, one embodiment include methods whereby a brick-and-mortar store offers access to digital content for users while those users are physically located in the store. Other example embodiments include methods whereby users accept an offer of digital content by another party while at a physical location and then receive that content. Yet another example includes embodiments such as provider-side and consumer-side applications and devices to provide and receive, respectively, the content.

Thus, various embodiments combine the digital realm with the physical realm. A user at a physical location participating in a brick-and-mortar channel of commerce receives digital content on a mobile device and, thus, also participates in an on-line, mobile channel of commerce.

It is a feature of various embodiments that the digital content is only made available when the user is located at a specific, physical location. As explained further below, there are various techniques for confirming a user's location, and the various embodiments may use any such technique now known or later developed. The digital experience provided to the user is limited to the physical location, such that when the user is at the physical location the user may download, stream, or otherwise access the content; when the user leaves, the access to the digital content is restricted or unavailable.

Using such a technique, a merchant with a physical location may offer the digital content as an incentive to participate in a commercial transaction at the physical location. FIG. 1 is an illustration of an aspect of an example embodiment. In FIG. 1, user 101 is at physical location 102 and has mobile device 103. On-line content provider 104 provides the digital media to user 101, according to the access conditions described further below. Content provider 104 may be a different entity than an entity that owns or manages the physical location 102, or may be the same entity.

In this example, physical location 102 is a hotel, and the hotel offers guests who stay at the hotel access to one or more e-books, free of additional charge, when the guests are physically located at the hotel. Further in this example, user 101 is a guest at the hotel and can access the one or more e-books on the user's mobile device 103 from content provider 104.

Mobile device 103 may include any type of mobile device configured to access digital content over a network. Examples include a notebook computer, a tablet computer (such as an iPad™ tablet computer), an MP3 player (such as an iPod™ music player), a e-book reader (such as the Kindle™ reader), a smartphone (such as the iPhone™ phone) and/or the like. Mobile device 103 includes at least one network connection operable to communicate with content provider 104 over network 105. Examples of network connections include 3G/4G wireless connections, 802.11 (Wi-Fi) connections to a LAN, WAN, or the Internet, a wired connection (such as by Ethernet), and/or the like. Mobile device 103 may also include one or more applications that provide advanced functionality, such as user identity verification, location determination, and the like.

The hotel (shown as physical location 102) may offer the right to the digital content as part of an advertised promotion that is publically announced outside of the physical location 102. In another example, the advertised promotion may be announced within the physical location. The scope of embodiments is not limited to any particular technique to announce the offer. The offer is made for the purpose of incentivizing user 101 to participate in a commercial transaction at the physical location—in this example, by increasing the desirability of a hotel stay through the additional offer of the digital content.

The user may access the content by, e.g., accessing network 105 through a web browser or specialized application (app) on mobile device 103. Furthermore, the user's access may be tied to an existing account of the user 101, such as a loyalty program for the hotel, an account with content provider 104, and/or the like. Thus, user 101 may access the content my directing a web browser to a location associated with the account or may open an application associated with the hotel or content provider 103. Any appropriate access method is adaptable for various embodiments.

User 101 may access the digital content on mobile device 103 at the physical location 102 of the hotel. To this end, the example of FIG. 1 provides a way to enforce the physical location requirement. In one embodiment, after the user 101 logs in, an application on mobile device 103 and/or a program running on a computer at physical location 102 or content provider 104 verifies the location of user 101. In an example wherein mobile device 103 is enabled to the Global Positioning System (GPS) or other satellite-based location service, a GPS receiver built into mobile device 103 discerns the location of user 101. Through a computer processor, an application on mobile device 103 and/or a program at content provider 104 analyzes location information received from the GPS receiver and makes a determination as to whether these signals are consistent with physical location 102. If so, then the content provider 104 may grant access of the digital content to the user. The user may be able to open, download, stream, or otherwise experience the digital content. If not, then the content provider 104 may deny access of the digital content to the user 101 and may optionally display a warning message.

In a different embodiment, mobile device 103 communicates with cell towers nearby (for example through a cellular band or mode). The cell towers can be used to triangulate the user's position based on communication with the user 101. In that manner, the content provider 104 may ascertain whether the user 101 is at physical location 102, and consequently whether access to the digital content should be granted to the user.

In yet another embodiment, mobile device 103 is configured to connect to a network at the physical location 102, so that mobile device 103 is assigned an Internet Protocol (IP) address. The IP address may be received and analyzed by an application on mobile device 103 and/or by the content provider 104. In response to the results of the analysis, content provider 104 may ascertain whether the user 101 is at physical location 104, and consequently whether access to the digital content should be granted to the user 101. In still another embodiment, user 101 arrives at the physical location 102 and meets with a person at the physical location 102. The person may be receptionist, concierge, or another suitable person who is assumed to be available only at physical location 102. After the user 101 arrives and checks in, the user 101 may be given a security code or a confirmation code from the person. The user 101 may send the security code to the content provider 104, and if the code is correct, access to the digital media may be granted to the user 101 for an appropriate time in which it is assumed that user 101 will be at physical location 102. Any technique now known or later developed to discern the physical location of user 101 may be adapted for use in various embodiments.

In some instances, content provider 104 downloads the digital content to mobile device 103, whereas in other embodiments, content provider 104 streams the digital content to mobile device 103. Should the user leave physical location 102, content provider 104 may terminate the streaming session. However, in a scenario wherein the content is downloaded onto mobile device 103 other methods may be used to deny or restrict access to the digital content. In one example, the content itself may have Digital Rights Management (DRM) software that allows its use only in certain physical locations. In another example, an application on mobile device 103 may have DRM software that prevents the content from being used other than at physical location 102.

Some embodiments may use the physical location restrictions on the digital content to drive more commerce after user 101 leaves physical location 102. In one example, the digital content that was offered free of charge at physical location 102 is offered to the user 101 for a charge or in conjunction with another commercial transaction at another physical location. Thus, after the user 101 leaves physical location 102, the user may receive a message asking the user 101 whether he or she desires to purchase the digital content at a promotional price. In another embodiment, the user 101 receives a message saying that the user 101 can purchase the content by going to a second location and purchasing a certain dollar amount of goods. The scope of embodiments is not limited to these examples for driving commerce after the user 101 leaves physical location 102, as other promotions for the same or different digital content may be made, as appropriate.

The embodiment described above provides one or more advantages. For instance, the hotel offering access to the digital content may use the offer of digital content as a marketing tool to persuade more people to choose the hotel over other hotels. The content provider may increase its exposure by specifically reaching out the hotel's guest population, thereby driving more customers to its content. Furthermore, the user 101 receives the benefit of the use of the digital content, at least for a limited time, and may enjoy his or her time at the hotel more because of the physical/digital pairing of the experience. However, these advantages are not limited to a hotel/guest example, as it is expected that such advantages would inure to the parties of any of a variety of different promotional arrangements and commercial transactions.

For instance, another embodiment includes an airline that offers digital content at its gates, lounge areas, and onboard its planes. The content may be provided to the passengers generally and/or through a loyalty program membership.

In another embodiment, a university offers learning materials to students on campus. For instance, various library books may be digitized and made available so that students may view the materials while shopping at a campus bookstore or eating at a cafe. The material may be offered as an incentive to drive commerce at the campus bookstores and cafes, to encourage students to live on-campus, or for other reasons.

In yet another example, a chain of coffee shops may offer music, movies, books, or other content to customers at the coffee shop's stores. Since many customers are used to going to a coffee shop to use its internet access, such a promotion is quite intuitive. Access to the digital content may be used to drive customers into the stores (from the point of view of the coffee shops) and may be used to promote a new artist or author (from the digital content provider's point of view).

At a given location, content may be offered to all corners or may be offered more selectively. For instance, a type of content (e.g., a particular magazine or music genre) may be selected based on characteristics of the user, such as spending habits or demographic information from the user's profile. In another example, access is given on a first-come-first-served basis, such as when the content provider may have only a limited number of licenses for a specific title. In other words, the geographical restriction described above may be coupled with other restrictions to use limited resources or to selectively match content to particular users, as appropriate.

FIG. 2 is an illustration of example process 200 according to one embodiment. Process 200 may be performed, for example, by an entity (e.g., a hotel or coffee shop) perhaps in conjunction with a content provider to provide an incentive to a user to do commerce at a physical location.

At block 210, the user is offered a right to a particular piece of digital content as part of a commercial transaction that occurs at least partly at the physical location. The offer may be publicized as part of a promotion or otherwise communicated to the user. In one example, the offer is communicated electronically on an electronic interface of the user's mobile device.

The commercial transaction includes more than just providing the digital content. For instance, as in the examples above, the underlying commercial transaction may include something entirely independent of the digital content, such as a commercial airline flight, a purchase of a cup of coffee, a hotel stay, and/or the like. The access to the digital content is added as an incentive for the user to participate in the commercial transaction.

In some examples the digital content is offered as an incentive to drive people to the physical location in the expectation of generating commerce from some of the people in the future. In other words, the digital content may be offered without obligation on the part of the user to actually complete the transaction. In one example, a new coffee shop may offer the content to all people in the store without verifying that a commercial transaction is ever consummated by any of the people. In such an embodiment, the offer of digital content is made to motivate people to get to the physical location, whether or not those people actually buy a good or service at that particular time.

At block 220, it is discerned that the user is at the physical location. In one embodiment, electronic feedback from the user's device to the content provider is used to discern the user's location. The electronic feedback may include one or more of: a GPS signal, a mobile telephone signal, an IP address, a confirmation code, and/or the like. In another example, an application in the user's mobile device performs at least some of the actions of block 220 using one or more of the electronic feedback examples. In any event, the user's location is detected, determined, or confirmed, and if the user is at the prescribed physical location, the user may be entitled to access the digital content.

At block 230, the content provider interacts with the user to provide the digital content to the user on a mobile device associated with the user. Examples include setting up a streaming session, performing a download, or other techniques to provide the digital content to the user. Some embodiments include an interface presented to the user on the mobile device to allow the user to login and select the digital content. Further in some embodiments, the particular piece of digital content can be selected by the user from a menu of digital content. In such an example, the user may utilize such interface to select the piece of digital content from the menu (e.g., by selecting a particular e-book from a menu having a multitude of e-books).

At block 240, the commercial transaction with the user is completed. For instance, block 240 may include following through with the grant of access of the digital content to ensure that the user does, indeed, have access to the digital content. Block 240 may also include following through with the underlying commercial transaction (e.g., providing a hotel stay, cup of coffee, etc.). Some embodiments may omit block 240 when the content is offered as an incentive to a commercial transaction without obligation to actually complete the transaction.

Block 250 includes offering the user a chance to access the digital content after the user has left the physical location. The offer of block 250 may include an additional commercial transaction. For instance, as explained above, the user may be presented with the opportunity to buy the digital content outright by itself or in addition to a promotion of another product or service. However, the opportunity to access the digital content in block 250 is not limited to a sale, as any access right, whether permanent or temporary, limited or unlimited, is within the scope of embodiments.

FIG. 3 is an illustration of example process 300 according to one embodiment. Process 300 may be performed, for example, by a human user and/or a mobile device of the user. The process of FIG. 3 is similar to the process of FIG. 2, except that the process of FIG. 3 is from the user's perspective.

At block 310, an offer for digital content is received as part of a commercial transaction that occurs at least partly at the physical location. The commercial transaction is between the user and another party. The other party may be, for example, a proprietor of a brick-and-mortar store, a digital content provider, a third party, and/or a combination thereof. As mentioned above, the offer may be an incentive to the commercial transaction without obligation on the part of the user. In such case, block 340 (below) may be omitted.

At block 320, the user and/or the user's mobile device is physically present at the physical location. Block 330 includes interacting with a provider of the digital content to receive the digital content on the user's mobile device. Such interacting may include providing an interface to the user and/or sending messages between the user's mobile device and the content provider to begin accessing the digital content. Block 330 may also include confirming the user's location to satisfy a geographical limitation of the access to the digital content.

Block 340 includes completing the commercial transaction with the other party. As explained above, the other commercial transaction may include, e.g., a purchasing a hotel stay or a cup of coffee, etc. Block 350 includes receiving an offer for a chance to access the digital content after the user has left the physical location. The offer and the additional commercial transaction may be the same as, or similar to, that described above with respect to block 250 of FIG. 2.

Figure 4:
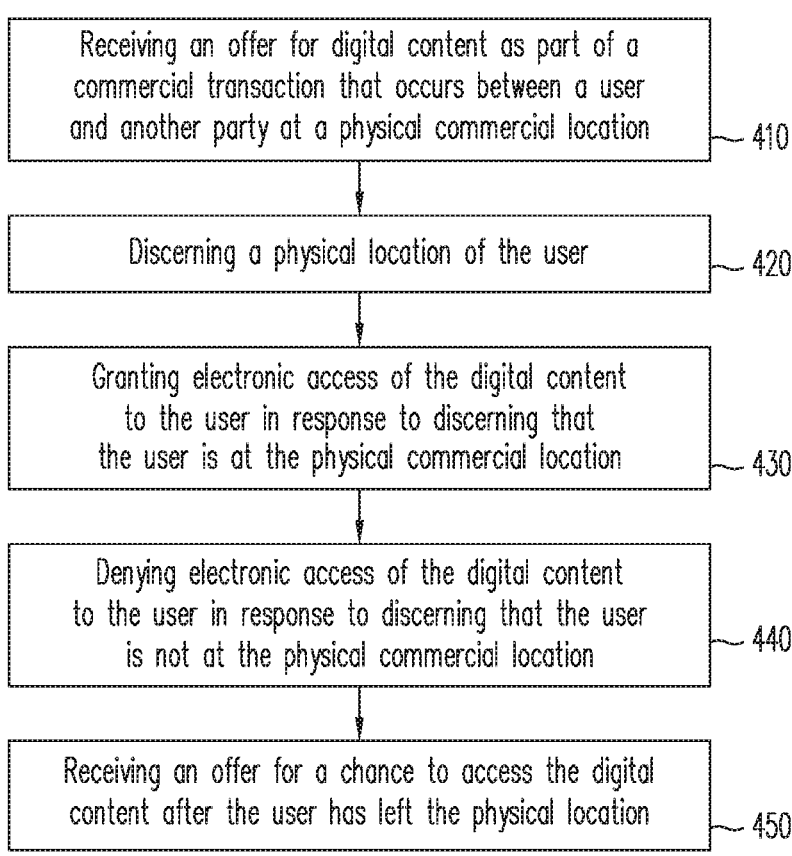
FIG. 4 is an illustration of an example process, adapted according to one embodiment, which may be performed by an application on a user's mobile device.

Various embodiments include an application running on a user's mobile device that allows the user to participate in the promotion described above. For instance, an application may include computer-readable code running on one or more processors at the user's mobile device. The processor executes the code to perform the actions described below. FIG. 4 is an illustration of exemplary process 400, adapted according to one embodiment, which may be performed by an application on a user's mobile device.

Block 410 includes receiving an offer for digital content as part of a commercial transaction that occurs between a user and another party at a physical commercial location. The offer may be contingent upon the user entering into the transaction or may be without such obligation on the part of the user. The offer is received at the mobile device of a user. For instance, the mobile device may communicate with a content provider, a proprietor of a brick-and-mortar store, a third party, or a combination thereof to receive the offer of digital content. Furthermore, the application may provide an interface to apprise the user of the offer and to allow the user to accept the offer and interact with the content provider, proprietor, and/or third party.

Block 420 includes discerning the physical location of the user. Block 420 may include similar actions as those described above with respect to block 220 of FIG. 2.

Block 430 includes granting electronic access of the digital content to the user in response to discerning that the user is at the physical commercial location. Block 430 may include, for instance, interacting with a provider of the digital content to receive the digital content on the mobile device. By contrast, block 440 includes denying electronic access of the digital content to the user in response to discerning that the user is not at the physical commercial location.

Block 450 includes receiving an offer for a chance to access the digital content after the user has left the physical location, e.g., as part of an additional commercial transaction.

It is understood that the processes 200, 300, and 400 may include additional steps that may be performed before, during, or after actions described above. For example, before the access of the digital content is granted to the user, the user may be required to enter a correct combination of a username and a password. In some instances, the user is prompted to become a member of a promotional program (e.g., a loyalty program), if the user is not already a member, before accessing the digital content. Furthermore, some embodiments may continually or periodically check the user's location, and if it is detected that the user is not at the specified physical location, disallowing access to the digital content. As yet another example, the various processes may offer the user a preview of the digital content before the user accesses the digital content.

Figure 5:
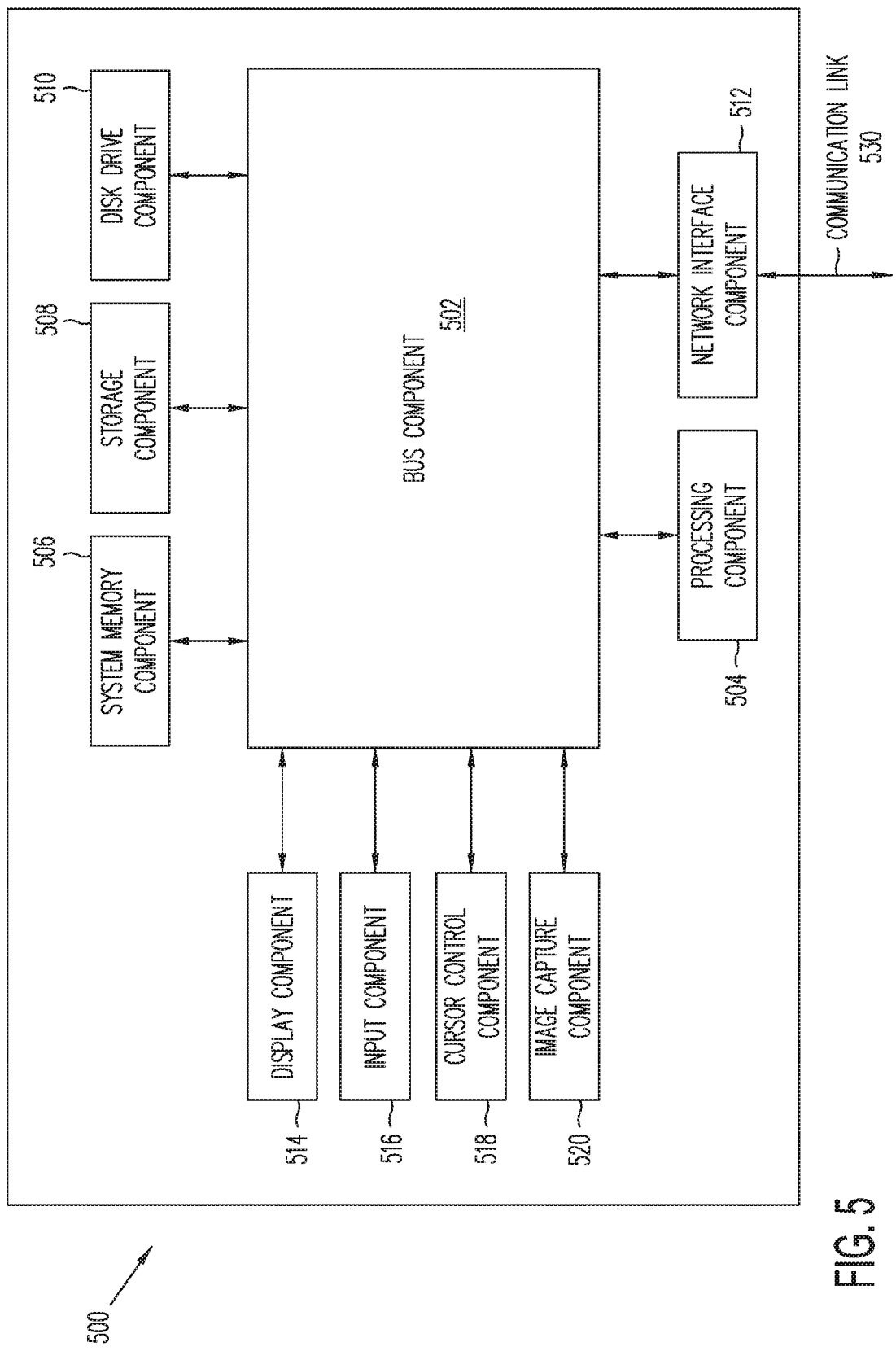
FIG. 5 is a block diagram of an example computer system suitable for implementing various methods and devices described herein, for example, the various action blocks of FIGS. 2-4.

FIG. 5 is a block diagram of an example computer system 500 suitable for implementing various methods and devices described herein, for example, the various action blocks of the processes 200, 300, and 400. In various implementations, user devices may comprise a network communications device (e.g., mobile cellular phone, laptop, personal computer, tablet, etc.) capable of communicating with a network, and a transaction provider device may comprise a network computing device (e.g., a network server, a computer processor, an electronic communications interface, etc). Accordingly, it should be appreciated that each of the devices may be implemented as the computer system 500 for communication with the network in a manner as follows.

In accordance with various embodiments of the present disclosure, the computer system 500, such as a mobile communications device and/or a network server, includes a bus component 502 or other communication mechanisms for communicating information, which interconnects subsystems and components, such as processing component 504 (e.g., processor, micro-controller, digital signal processor (DSP), etc.), system memory component 506 (e.g., RAM), static storage component 508 (e.g., ROM), disk drive component 510 (e.g., magnetic or optical), network interface component 512 (e.g., modem or Ethernet card), display component 514 (e.g., cathode ray tube (CRT) or liquid crystal display (LCD)), input component 516 (e.g., keyboard), cursor control component 518 (e.g., mouse or trackball), and image capture component 520 (e.g., analog or digital camera). In one implementation, disk drive component 510 may comprise an array having one or more disk drive components.

In accordance with embodiments of the present disclosure, computer system 500 performs specific operations by processor 504 executing one or more sequences of one or more instructions contained in system memory component 506. Such instructions may be read into system memory component 506 from another computer readable medium, such as static storage component 508 or disk drive component 510. In other embodiments, hard-wired circuitry may be used in place of (or in combination with) software instructions to implement the present disclosure.

Logic may be encoded in a computer readable medium, which may refer to any medium that participates in providing instructions to processor 504 for execution. Such a medium may take many forms, including but not limited to, non-volatile media and volatile media. In one embodiment, the computer readable medium is non-transitory. In various implementations, non-volatile media includes optical or magnetic disks, such as disk drive component 510, and volatile media includes dynamic memory, such as system memory component 506. In one aspect, data and information related to execution instructions may be transmitted to computer system 500 via a transmission media, such as in the form of acoustic or light waves, including those generated during radio wave and infrared data communications. In various implementations, transmission media may include coaxial cables, copper wire, and fiber optics, including wires that comprise bus 502.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other non-transitory medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 530 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 500 may transmit and receive messages, data, information and instructions, including one or more programs (i.e., application code) through communication link 530 and communication interface 512. Received program code may be executed by processor 504 as received and/or stored in disk drive component 510 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

It should be appreciated that like reference numerals are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
    at least one processor; and
    at least one memory device storing computer-executable instructions that, in response to execution by the at least one processor, cause the system to perform operations comprising:
        determining that a digitally stored content is associated with a first geo-fence corresponding to a first area, wherein access to the digitally stored content is restricted based on geo-location;
        detecting, via communication with a location module of a mobile device of a user, a location of the mobile device;
        in response to determining that the location of the mobile device is within the geo-fence corresponding to the first area:
            identifying an account associated with the user,
            transmitting a first electronic message to an account associated with the user offering to provide the digitally stored content to the mobile device, wherein the first electronic message provides an interface to allow the user to accept an offer corresponding to the digitally stored content, and
            in response to determining that the user has accepted the offer, granting the user electronic access to the digitally stored content;
        in response to detecting, at a later time period, via communication with the location module of the mobile device, that the mobile device is located is outside of the geo-fence corresponding to the first area, restricting, in real-time, electronic access to the digitally stored content; and
        transmitting a second electronic message offering to extend the electronic access to the digitally stored content outside of the geo-fence.

2. The system of claim 1, wherein the operations further comprise:
    in response to determining that the location of the mobile device is within the geo-fence corresponding to the first area, determining promotional offers associated with a plurality of merchants corresponding to the first area; and
    displaying the promotional offers to the user.

3. The system of claim 2, wherein the promotional offers are displayed based on determining that the user is registered with one or more loyalty programs associated with each of the plurality of merchants.

4. The system of claim 1, wherein the digitally stored content is configured to be streamed on mobile device.

5. The system of claim 1, wherein the digitally stored content comprises an audio content or a video content.

6. The system of claim 1, wherein the transmitting the first electronic message offering to provide the digitally stored content further comprises determining that the digitally stored content corresponds to one or more characteristics of the user.

7. The system of claim 1, wherein the digitally stored content includes a content that corresponds to an item for sale within the first area.

8. The system of claim 1, wherein the location module utilizes a Global Positioning System signal.

9. The system of claim 1, wherein the digitally stored content includes a first portion of a first content that is for sale within the first area.

10. The system of claim 1, wherein the operations further comprise in response to determining that an offer provided in the second electronic message has been accepted, restoring access to the digitally stored content.

11. The system of claim 1, wherein the digitally stored content comprises an electronic book.

12. A method, comprising:
 determining that a digitally stored content is associated with a first geo-fence corresponding to a first area, wherein access to the digitally stored content is restricted based on geo-location;
 detecting, via communication with a location module of a mobile device of a user, a location of the mobile device;
 in response to determining that the location of the mobile device is within the geo-fence corresponding to the first area:
  identifying an account associated with the user, and
  transmitting a first electronic message to an account associated with the user offering to provide the digitally stored content to the mobile device, wherein the first electronic message provides an interface to allow the user to accept an offer corresponding to the digitally stored content, and
  in response to determining that the user has accepted the offer, granting the user electronic access to the digitally stored content;
 in response to detecting, at a later time period, via communication with the location module of the mobile device, that the mobile device is located is outside of the geo-fence corresponding to the first area, restricting, in real-time, electronic access to the digitally stored content; and
 transmitting a second electronic message offering to extend the electronic access to the digitally stored content outside of the geo-fence.

13. The method of claim 12, further comprising:
 in response to determining that the location of the mobile device is within the geo-fence corresponding to the first area, determining promotional offers associated with a plurality of merchants corresponding to the first area; and
 displaying the promotional offers to the user.

14. The method of claim 13, wherein the promotional offers are displayed based on determining that the user is registered with one or more loyalty programs associated with each of the plurality of merchants.

15. The method of claim 12, wherein the digitally stored content is configured to be streamed on the mobile device.

16. The method of claim 12, wherein the digitally stored content comprises an audio content or a video content.

17. A non-transitory machine-readable medium comprising instructions which, in response to execution by a computer system, cause the computer system to perform operations comprising:
 determining that a digitally stored content is associated with a first geo-fence corresponding to a first area, wherein access to the digitally stored content is restricted based on geo-location;
 detecting, via communication with a location module of a mobile device of a user, a location of the mobile device;
 in response to determining that the location of the mobile device is within the geo-fence corresponding to the first area:
  identifying an account associated with the user, and
  transmitting a first electronic message to an account associated with the user offering to provide the digitally stored content to the mobile device, wherein the first electronic message provides an interface to allow the user to accept an offer corresponding to the digitally stored content, and
  in response to determining that the user has accepted the offer, granting the user electronic access to the digitally stored content;
 in response to detecting, at a later time period, via communication with the location module of the mobile device, that the mobile device is located is outside of the geo-fence corresponding to the first area, restricting, in real-time, electronic access to the digitally stored content; and
 transmitting a second electronic message offering to extend the electronic access to the digitally stored content outside of the geo-fence.

18. The non-transitory machine-readable medium of claim 17, wherein the operations further comprise:
 in response to determining that the location of the mobile device is within the geo-fence corresponding to the first area, determining promotional offers associated with a plurality of merchants corresponding to the first area; and
 displaying the promotional offers to the user.

19. The non-transitory machine-readable medium of claim 17, wherein transmitting the first electronic message offering to provide the digitally stored content further comprises determining that the digitally stored content corresponds to one or more characteristics of the user.

20. The non-transitory machine-readable medium of claim 17, wherein the operations further comprise in response to determining that an offer provided in the second electronic message has been accepted, restoring access to the digitally stored content.

* * * * *